(12) United States Patent
Kawano et al.

(10) Patent No.: US 8,686,675 B2
(45) Date of Patent: Apr. 1, 2014

(54) POWER TOOL

(75) Inventors: Yoshikazu Kawano, Ibaraki (JP);
Nobihiro Takano, Ibaraki (JP); Eiji Nakayama, Ibaraki (JP); Kenro Ishimaru, Ibaraki (JP); Kazumi Tanaka, Ibaraki (JP); Masahiro Isono, Ibaraki (JP)

(73) Assignee: Hitachi Koki Co., Ltd., Tokyo (JP)

( * ) Notice: Subject to any disclaimer, the term of this patent is extended or adjusted under 35 U.S.C. 154(b) by 791 days.

(21) Appl. No.: 12/690,083

(22) Filed: Jan. 19, 2010

(65) Prior Publication Data
US 2011/0148332 A1 Jun. 23, 2011

(30) Foreign Application Priority Data

Jan. 19, 2009 (JP) ................................. 2009-009389
Mar. 31, 2009 (JP) ................................. 2009-083910

(51) Int. Cl.
*H02P 1/04* (2006.01)
(52) U.S. Cl.
USPC ............................. 318/430; 318/432; 318/434
(58) Field of Classification Search
USPC ............ 318/430–434, 490, 569, 700, 400.07, 318/400.09
See application file for complete search history.

(56) References Cited

U.S. PATENT DOCUMENTS 4,307,325 A * 12/1981 Saar ............................... 388/809
4,550,277 A * 10/1985 Carney .......................... 388/809
RE33,379 E * 10/1990 Bradus .......................... 388/812
2011/0148332 A1* 6/2011 Kawano et al. ............... 318/244
2011/0284256 A1* 11/2011 Iwata ............................ 173/176

FOREIGN PATENT DOCUMENTS

| CN | 1500022 A | 5/2004 |
|---|---|---|
| CN | 1722603 A | 1/2006 |
| EP | 1 295 658 A1 | 3/2003 |
| JP | H06-254440 A | 9/1994 |
| JP | 10-127073 A | 5/1998 |
| JP | 11-93847 A | 4/1999 |
| JP | 2004-194422 A | 7/2004 |
| JP | 2007-83375 A | 4/2007 |
| JP | 2007-195366 A | 8/2007 |
| JP | 2008-43140 A | 2/2008 |

OTHER PUBLICATIONS

Japanese Office Action for the related Japanese Patent Application No. 2009-083910 dated Apr. 4, 2013.
Chinese Office Action for related Chinese Patent Application No. 201010001270.6 dated Sep. 21, 2011.

* cited by examiner

*Primary Examiner* — Karen Masih
(74) *Attorney, Agent, or Firm* — Kenealy Vaidya LLP

(57) ABSTRACT

According to an aspect of the present invention, there is provided a power tool including: a motor; a switching device that switches over, in response to a conduction angle thereof, an AC voltage to be applied to the motor; a rotation speed setting unit that sets a target rotation speed of the motor; a rotation speed detection unit that detects an actual rotation speed of the motor; and a controller that determines the conduction angle by comparing the actual rotation speed with the target rotation speed and that controls the switching device by use of the conduction angle based on a maximum conduction angle, the maximum conduction angle being set in accordance with the target rotation speed.

16 Claims, 12 Drawing Sheets

| ROTATION SPEED SET VALUE (DIAL) | TRIAC MAXIMUM CONDUCTION ANGLE RATIO | |
|---|---|---|
| | A | B |
| 1 | 20% | 30% |
| 2 | 40% | 50% |
| 3 | 60% | 70% |
| 4 | 80% | 90% |

| ROTATION SPEED SET VALUE (DIAL) | TRIAC MAXIMUM CONDUCTION ANGLE ||
|---|---|---|
| | PRIMARY MAXIMUM CONDUCTION ANGLE | SECONDARY MAXIMUM CONDUCTION ANGLE |
| 1 | 15% | 10% |
| 2 | 30% | 20% |
| 3 | 45% | 30% |
| 4 | 60% | 40% |

FIG. 13

MAXIMUM CONDUCTION ANGLE IN SOFT START

| TARGET ROTATION SPEED | MAXIMUM CONDUCTION ANGLE OF TRIAC (%) | |
|---|---|---|
| | 0 TO 0.5 SECONDS | 0.5 TO 1.0 SECOND |
| 0～4,000min$^{-1}$ | 10 | 5 |
| 4,000～5500min$^{-1}$ | 15 | 8 |
| 4,500～5,000min$^{-1}$ | 20 | 11 |
| 5,000～5,500min$^{-1}$ | 25 | 13 |
| 5,500～6,000min$^{-1}$ | 30 | 17 |
| 6,000～6,500min$^{-1}$ | 35 | 19 |
| 6,500～7,000min$^{-1}$ | 40 | 24 |
| 7,000～7,500min$^{-1}$ | 45 | 26 |
| 7,500～8,000min$^{-1}$ | 50 | 31 |
| 8,000～8,500min$^{-1}$ | 55 | 34 |
| 8,500～9,000min$^{-1}$ | 60 | 40 |
| 9,000 min$^{-1}$～ | 65 | 43 |

FIG. 14

LIST OF FB AMOUNT OF PROPORTIONAL CONTROL

| DEVIATION FROM TARGET ROTATION SPEED | FB AMOUNT OF PROPORTIONAL CONTROL ($\mu$s) | |
|---|---|---|
| | SOFT START | STEADY ROTATION |
| 0~50min$^{-1}$ | 3 | 0 |
| 50~100min$^{-1}$ | 8 | 2 |
| 100~150min$^{-1}$ | 13 | 3 |
| 150~200min$^{-1}$ | 18 | 4 |
| 200~250min$^{-1}$ | 23 | 6 |
| 250~300min$^{-1}$ | 28 | 7 |
| 300~350min$^{-1}$ | 33 | 8 |
| 350~400min$^{-1}$ | 38 | 10 |
| 400~450min$^{-1}$ | 43 | 11 |
| 450~500min$^{-1}$ | 49 | 12 |
| 500~600min$^{-1}$ | 56 | 14 |
| 600~700min$^{-1}$ | 61 | 15 |
| 700~800min$^{-1}$ | 77 | 19 |
| 800~900min$^{-1}$ | 87 | 22 |
| 900~1,000min$^{-1}$ | 97 | 24 |
| 1,000 min$^{-1}$~ | 112 | 28 |

POWER TOOL

CROSS-REFERENCE TO RELATED APPLICATIONS

This application is based upon and claims priorities from Japanese Patent Application No. 2009-009389 filed on Jan. 19, 2009 and from Japanese Patent Application No. 2009-083910 filed on Mar. 31, 2009, the entire contents of which are incorporated herein by reference.

BACKGROUND OF THE INVENTION

1. Field of the Invention

The present invention relates to a power tool using an AC motor. More particularly, the present invention relates to a power tool having controller for controlling a rotation speed of a motor with a conduction angle of a semiconductor device and to a power tool having controller for controlling a rotation speed of a motor with a conduction angle of a semiconductor device.

2. Description of the Related Art

In a power tool, it is important to control a rotation speed of the motor to not fluctuate even if a load to be applied to the motor is changed. For this reason, it has widely been carried out to detect the rotation speed of the motor by a rotation speed detection unit and to monitor a difference between a result of the detection and a set rotation speed, thereby performing a rotation control. For example, in JP-2004-194422-A, an AC motor is used as the motor of the power tool. When the AC motor is used, a signal output from a rotation speed detection unit is fed back to a signal for setting a conducing angle of a triac, thereby carrying out a constant rotation control for maintaining a rotation speed of the motor to be constant.

In order to increase/decrease the rotation speed of the motor, generally, a conduction angle of a semiconductor device such as a triac is changed as described in JP-2004-194422-A. The conduction angle is expressed in % within an angle range (0° to 180°) from a phase angle at which the triac is turned ON to a zero-cross point. In order to protect the motor, a current flowing to the motor is detected and the motor is stopped when a preset overcurrent set value is exceeded. An exemplary conventional control method will be described with reference to FIG. 5.

FIG. 5 illustrates a motor rotation control circuit according to the conventional art. An AC power supply 101 has a single phase of 100 V at 50 Hz or 60 Hz, for example, and an alternating current is ON/OFF controlled by a switch 102. A phase angle for starting a conduction is controlled by a triac 127 so that a rotation speed of a motor 103 is controlled. A shunt resistor 140 is inserted for detecting a current flowing to the motor 103 and a custom IC 123 measures a voltage applied to both terminals of the shunt resistor 140, thereby detecting a current value. The custom IC 123 includes an overcurrent detection circuit, which is not shown. If it is decided that an overcurrent flows to the motor 103, a supply of a power to the motor 103 is blocked. A diode 116, a resistor 117 and an electrolytic capacitor 119 are power circuits for carrying out a half-wave rectification and a direct current which is generated is supplied to the custom IC 123.

A resistor 131 and variable resistors 132 and 133 have resistance values for setting the rotation speed of the motor 103, and a voltage (set voltage) set by the variable resistor 132 is input to a positive side of a comparator 123a in the custom IC 123. The motor 103 is provided with a rotation speed sensor 106 for detecting the rotation speed, and an output (feedback voltage) of the rotation speed sensor 106 is input to a negative side of the comparator 123a. The comparator 123a generates a trigger signal based on a difference between the set voltage and the feedback voltage, and the trigger signal is input to the triac 127 through a resistor 128 to control a conduction angle of the triac 127 so that a voltage to be applied to the motor 103 is regulated.

In the method of detecting an overcurrent according to the conventional art, it is necessary to insert the shunt resistor 140 in a circuit for supplying a current to the motor. For this reason, the current flowing to the motor always increases a power consumption in order to flow to the shunt resistor 140. It is necessary to incorporate, in the custom IC 123, a circuit for detecting a voltage applied to both terminals of the shunt resistor 140 and deciding whether an overcurrent flows or not.

In a power tool, it is important to control the rotation speed of the motor to not fluctuate even if a load to be applied to the motor is changed. For this reason, the rotation speed of the motor is detected by a rotation speed detection unit and a difference between a result of the detection and a set rotation speed is monitored to carry out a feedback control. In a power tool using an AC motor, a difference from the set rotation speed which is detected is reflected by a change in a conduction angle of a triac so that the rotation speed of the motor is maintained to be constant. The conduction angle is expressed in a percentage (%) of an angle range (0° to 180°) from a phase angle at which the triac is turned ON to a zero-cross point. In the power tool using the AC motor, the motor is frequently turned ON/OFF. Therefore, it is important to start the motor quickly and stably. Although not a control in the power tool, JP-H06-254440 discloses a method of starting an AC motor without an overshoot or an undershoot when a setting state is brought after starting in a rotor rotation control of a centrifugal separator.

The prior art in which a difference between a target rotation speed of the AC motor and an actual rotation speed is fed back to a conduction angle of a triac can be well applied to a control in the case in which the motor is rotated at a certain rotation speed. However, the inventors found that there is the following problem if the prior art is exactly applied to a control in the starting operation of the motor. The state will be described with reference to FIG. 8.

FIG. 8 illustrates a starting characteristic of the motor. An axis of ordinate indicates a rotation speed (r.p.m) of the motor and an axis of abscissa indicates an elapsed time (second). In the drawing, a curve shown in a solid line represents an ideal accelerating situation from a starting operation in the motor to a target rotation speed. When a conduction angle of a triac is set to be slightly great in order to prevent a delay of a responsiveness of the motor in the starting operation of the motor, an acceleration is carried out after starting the motor and a target rotation speed is once exceeded like a curve shown in a dotted line to cause an overshoot, and the target rotation speed is approximated while an undershoot and the overshoot are then repeated. In order to prevent the overshoot or the undershoot, it can also be proposed to cause a responsiveness of a rotation speed control to be poorer (slower) than that of the motor. In that case, the overshoot can be prevented. However, the acceleration of the motor is made slow like a curve shown in a dotted line on a lower side, that is, a so-called slow start is carried out. Consequently, a long time is taken for the starting operation.

Also in the technique described in JP-H06-254440, there is eliminated the overshoot or the undershoot when a setting state is brought after the starting operation. However, the AC motor to be used is an induction motor and a motor current is regulated to control an angle of ignition of a phase control device for controlling a current to be given to the induction motor (which is included in a motor driving circuit), thereby eliminating the overshoot. In the technique described in JP-H06-254440, however, an alternating current having both frequencies including a slip frequency and a synchronizing frequency is used to carry out the control in the starting operation, and furthermore, the angle of ignition is switched. Therefore, a premise is different from that in a method of controlling an AC motor to be started and accelerated without changing a frequency as in an AC motor such as a commutator motor for carrying out a control with only the conduction angle of the triac. Accordingly, the technique described in JP-H06-254440 cannot be exactly applied to the AC motor such as the commutator motor.

SUMMARY OF THE INVENTION

In consideration of the background, it is an object of the invention to provide a power tool which can prevent burning of a motor without increasing a power consumption.

It is another object of the invention to provide a power tool capable of detecting an overcurrent flowing to a motor without using a shunt resistor.

It is a further object of the invention to control a rotation of an AC motor safely and efficiently by using a microcomputer.

Typical features of the invention disclosed in the application will be described as follows.

According to an aspect of the present invention, there is provided a power tool including: a motor; a switching device that switches over, in response to a conduction angle thereof, an AC voltage to be applied to the motor; a rotation speed setting unit that sets a target rotation speed of the motor; a rotation speed detection unit that detects an actual rotation speed of the motor; and a controller that determines the conduction angle by comparing the actual rotation speed with the target rotation speed and that controls the switching device by use of the conduction angle based on a maximum conduction angle, the maximum conduction angle being set in accordance with the target rotation speed.

The controller may detect an overcurrent state when the conduction angle exceeds the maximum conduction angle.

The controller may have a storage unit. And, the storage unit may pre-store a relationship between the target rotation speed and a corresponding maximum conduction angle at which an overcurrent is caused.

The relationship between the target rotation speed and the corresponding maximum conduction angle may be set for each frequency of input AC power.

The rotation speed setting unit may be a dial switch. And, the maximum conduction angle may be set in accordance with a manipulation of the dial switch.

The controller may stop the motor based on the maximum conduction angle.

The controller may reduce the target rotation speed of the motor based on the maximum conduction angle.

The controller may reduce the actual rotation speed by decreasing the conduction angle based on the maximum conduction angle.

The controller may calculate the conduction angle by comparing the actual rotation speed with the target rotation. And, the controller may output a regulated conduction angle to the switching device, the regulated conduction angle being the same as the maximum conduction angle if the calculated conduction angle exceeds the maximum conduction angle.

According to the first aspect of the invention, the controller decides the overcurrent state based on the maximum conduction angle corresponding to the rotation speed which is set. Therefore, it is possible to detect the overcurrent state of the motor with an inexpensive structure without using a shunt resistor for detecting a current.

According to the second aspect of the invention, the controller decides that the overcurrent state is brought when the conduction angle of the semiconductor device exceeds the maximum conduction angle corresponding to the rotation speed which is set. Therefore, it is possible to reliably detect the overcurrent state, thereby preventing burning of the motor.

According to the third aspect of the invention, the controller has the storage unit, and the storage unit pre-stores the relationship between the set rotation speed of the motor and the maximum conduction angle to generate the overcurrent. Therefore, the controller can instantaneously obtain the maximum conduction angle.

According to the fourth aspect of the invention, the relationship between the set rotation speed and the maximum conduction angle is set depending on the frequency of the input AC power. Therefore, it is possible to correspond to a plurality of motors by a single control device.

According to the fifth aspect of the invention, the rotation speed setting unit is the dial switch and the controller sets the maximum conduction angle corresponding to the set amount of the dial switch. Therefore, it is possible to detect the overcurrent with high precision corresponding to the rotation speed which is set.

According to the sixth aspect of the invention, the controller stops the motor when deciding that the overcurrent state is brought. Therefore, it is possible to prevent the burning of the motor.

According to the seventh aspect of the invention, the set rotation speed of the motor is reduced when it is decided that the overcurrent state is brought. Therefore, it is possible to continuously carry out the work while preventing the burning of the motor.

According to the eighth aspect of the invention, the controller decreases the conduction angle of the semiconductor device in a certain amount in order to reduce the set rotation speed. Therefore, it is possible to effectively avoid the overcurrent state.

According to the ninth aspect of the invention, the controller carries out a control so that the conduction angle of the semiconductor device does not exceed the maximum conduction angle corresponding to the set rotation speed. Therefore, it is possible to avoid the generation of the overcurrent state.

The above and other objects and novel features of the invention will be apparent from the following description of the specification and the drawings.

In consideration of the background, it is another object of the invention to provide a power tool for controlling a rotation of an AC motor by using a triac in which an acceleration can be well carried out without an overshoot in a starting operation of the motor, thereby shortening a time required for the starting operation.

It is another object of the invention to provide a power tool in which a rotation control in a starting operation of an AC motor is efficiently carried out by using a microcomputer.

According to another aspect of the present invention, there is provided a power tool including: a motor; a switching device that switches over, in response to a conduction angle thereof, an AC voltage to be applied to the motor; a controller that controls the conduction angle, thereby controlling an actual rotation speed of the motor, wherein, when starting the motor, the controller controls the conduction angle within a range of a first maximum conduction angle during a first period and within a range of a second maximum conduction angle that is smaller than the first maximum conduction angle during a second period, the first period starting at a start-up of the motor, the second period being continuous with the first period.

The controller may have a storage unit. And, the storage unit may pre-store the first maximum conduction angle and the second maximum conduction angle.

The power tool may further include: a rotation speed setting unit that sets a target rotation speed of the motor; and a rotation speed detection unit that detects the actual rotation speed of the motor. The controller may determine the conduction angle by comparing the actual rotation speed with the target rotation speed.

The storage unit may store a plurality of sets of the first maximum conduction angle and the second maximum conduction angle for each target rotation speed.

The storage unit may store a relationship between the first maximum conduction angle and the second maximum conduction angle for each frequency of input AC power.

The storage unit may store a ratio of the first maximum conduction angle to the second maximum conduction angle for each target rotation speed.

The first period may be defined from a time where the motor is started up to a time where a given time has been elapsed. And, the second period may be defined from a time where the motor is still not reached to a steady rotation speed to a time where the motor is reached to the steady rotation speed.

The controller may perform a feedback of a deviation of the actual rotation speed from the target rotation speed through a proportional element. And, a unit amount of the feedback of the motor may be controlled to be larger in a time of starting and accelerating than that in a time of steadily rotating.

According to the first aspect of the invention, the conduction angle of the semiconductor device is controlled so that the first maximum conduction angle is not exceeded from the starting operation of the motor to the first predetermined time and the conduction angle of the semiconductor device is controlled so that the second maximum conduction angle which is smaller than the first maximum conduction angle is not exceeded from the first predetermined time to the second predetermined time. Therefore, it is possible to shorten a time required for the starting operation without causing an overshoot when starting the motor.

According to the second aspect of the invention, the controller has storage unit, and the relationship between the first maximum conduction angle and the second maximum conduction angle which correspond to the set rotation speed of the motor is pre-stored in the storage unit. Therefore, the controller can obtain the maximum conduction angle instantaneously.

According to the third aspect of the invention, the controller compares the detecting signal output from the rotation speed detection unit with the rotation speed setting signal set by the rotation speed setting unit, thereby increasing/decreasing the conduction angle. Therefore, it is possible to start the motor with high precision corresponding to the rotation speed which is set.

According to the fourth aspect of the invention, the first maximum conduction angle and the second maximum conduction angle are prepared in plural sets for each set rotation speed and are stored in the storage unit. Therefore, it is possible to finely control a rotation every rotation speed region of the motor.

According to the fifth aspect of the invention, the relationship between the first maximum conduction angle and the second maximum conduction angle which correspond to the set rotation speed is set depending on the frequency of the input AC power. Therefore, it is possible to correspond to a plurality of motors by a single control device.

According to the sixth aspect of the invention, the ratio of the first maximum conduction angle and the second maximum conduction angle which are stored in the storage unit is set to be increased or decreased every time the set rotation speed is increased. Therefore, it is possible to finely control a rotation every rotation speed region of the motor. In particular, it is possible to carry out a control in order to generate a sufficient rotation torque in a region in which the rotation speed of the motor is low.

According to the seventh aspect of the invention, the first predetermined time is the time interval before the steady rotation speed is reached after the starting operation of the motor, and the second predetermined time is the time interval from the time that the steady rotation speed of the motor has not been reached to the time that the steady rotation speed has been reached. Therefore, it is possible to finely control sections in the starting operation and steady rotation arrival of the motor based on separate control parameters.

According to the eighth aspect of the invention, the unit amount of the feedback in each of the starting and accelerating operations of the motor is controlled to be larger than that of the feedback in the steady rotation of the motor. Therefore, it is possible to reduce a fluctuation in the rotation in the steady rotation.

The above and other objects and novel features of the invention will be apparent from the following description of the specification and the drawings.

BRIEF DESCRIPTION OF THE DRAWINGS

FIG. 13 illustrates another example of set values of a target rotation speed of the motor 1003 and a maximum conduction angle in starting and accelerating operations.

FIG. 14 illustrates a relationship between a deviation from the target rotation speed of the motor 1003 and a feedback amount.

DETAILED DESCRIPTION OF THE INVENTION

Embodiment 1

Figure 1:
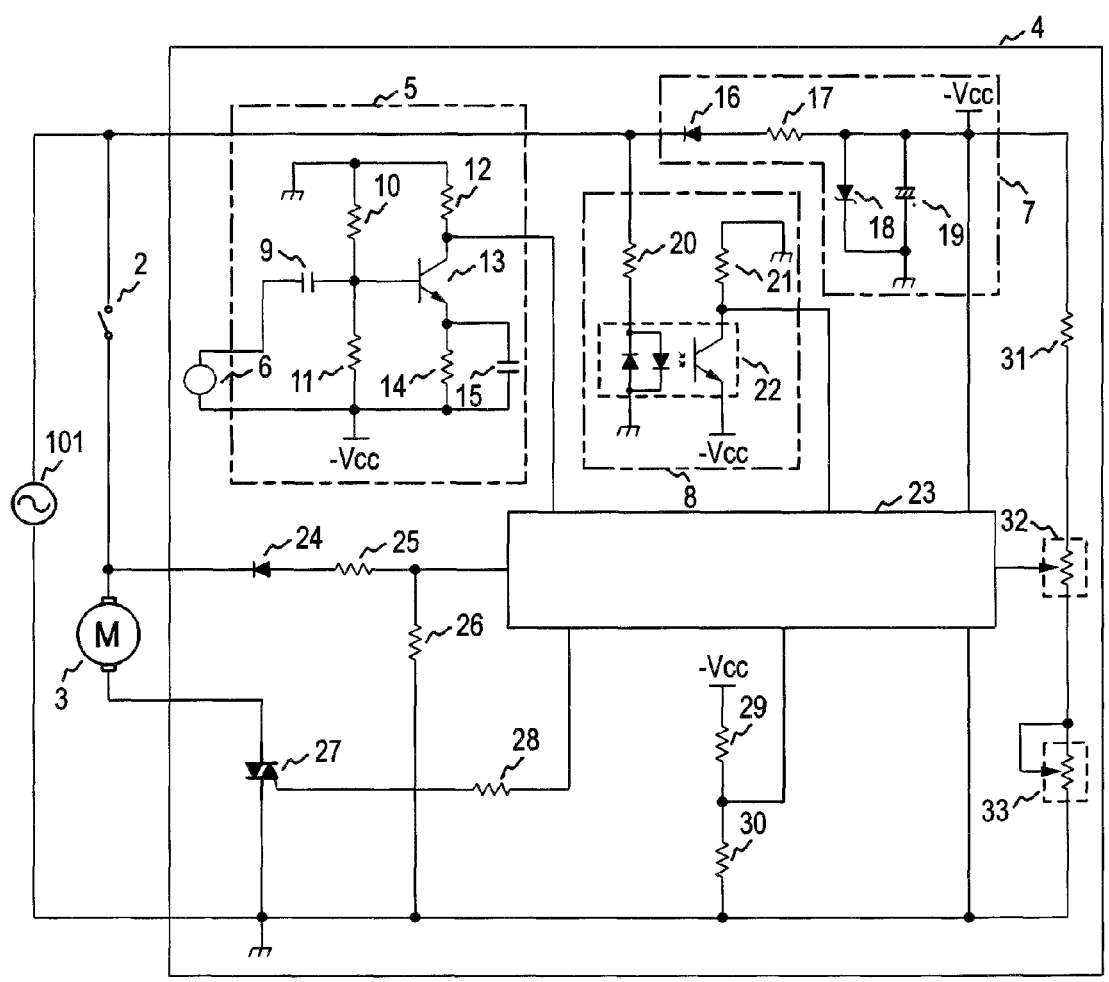
FIG. 1 illustrates a motor rotation control circuit according to Embodiment 1.

Embodiment 1 according to the invention will be described below with reference to the drawings. FIG. 1 illustrates a motor rotation control circuit according to this embodiment. An AC power supply 101 has a single phase of 100V at 50 Hz or 60 Hz, for example, and an alternating current is ON/OFF controlled by a switch 2. A rotation control device 4 includes a rotation speed sensor 6 for detecting a rotation speed of a motor 3, a rotation speed signal amplification circuit 5 for amplifying a rotation speed signal output from the rotation speed sensor 6, a microcomputer 23, a power circuit 7 for creating a reference power supply to the microcomputer 23 and a control circuit, a zero-cross detection circuit 8 for detecting a zero-cross point of an AC voltage, a diode 24 and resistors 25 and 26 for detecting ON/OFF of the switch 2 and for transmitting a switch ON/OFF signal to the microcomputer 23, a triac 27 (semiconductor device) for controlling a phase of a voltage applied to the motor 3, a resistor 28 for inputting a gate signal to the triac 27, resistors 29 and 30 for setting a maximum conduction angle depending on a characteristic of the motor 3, a resistor 31 and variable resistors 32 and 33 for setting the rotation speed of the motor 3.

The rotation speed signal amplification circuit 5 is an AC amplifier including capacitors 9 and 15, resistors 10, 11, 12 and 14, and a transistor 13, and amplifies the rotation speed signal sent from the rotation speed sensor 6 within a range of 0V to −VCC and outputs the amplified signal to the microcomputer 23. The microcomputer 23 uses the output signal to detect the rotation speed of the motor 3.

The power circuit 7 is a half-wave rectifying circuit which includes a diode 16, a resistor 17, a zener diode 18, and an electrolytic capacitor 19, and serves to convert an AC voltage into a direct current and to supply the direct current into the microcomputer 23 and a circuit of the power tool which is not shown.

The zero-cross detection circuit 8 includes resistors 20 and 21 and a photocoupler 22. An AC voltage is first attenuated by the resistor 20 and is sent to an input portion (light emitting diode) of the photocoupler 22. Two light emitting diodes are connected to the input portion of the photocoupler 22 in reverse directions to each other. The light emitting diodes emit a light regardless of a current flow direction, and are turned OFF only around a zero-cross point, that is, at a low voltage. The photocoupler 22 includes a phototransistor as an output portion, and is brought into an ON state only when the light emitting diode in the input portion emits a light. In other words, the phototransistor is brought into an OFF state only on only the zero-cross point and is brought into the ON state in the other range. Therefore, 0V is input to the microcomputer 23 through the resistor 21 on only the zero-cross point and −VCC is input in the other range. By a change in a signal to be input to the microcomputer 23, the microcomputer 23 can obtain a reference signal for controlling a phase of the triac 27.

Next, an operation of the rotation speed control device 4 will be described with reference to a flowchart of FIG. 2. When an AC cord (not shown) of the power tool is connected so that an AC voltage is supplied from the AC power supply 101, a constant DC voltage is supplied to the microcomputer 23 through the power circuit 7. An AC voltage supplied from the AC power supply 101 is input to the zero-cross detection circuit 8. The microcomputer 23 measures time intervals of a zero-cross signal input from the zero-cross detection circuit 8 to detect a frequency of the input AC power (Step 201).

Then, the microcomputer 23 detects a target rotation speed setting voltage of the motor 3 which is set by the resistor 31 and the variable resistors 32 and 33 and sets a target rotation speed (Step 202). The variable resistor 32 is manipulated by a user through a dial to set a rotation speed, and is a setting unit to set the rotation speed of the motor 3 in several stages (for example, four stages of 1 to 4 of the dial), for instance. The variable resistor 33 is provided to suppress a variation in a control circuit.

Thereafter, the microcomputer 23 sets a maximum conduction angle of the triac 27 (Step 203). A current-rotation speed characteristic of the motor 3 will be described with reference to FIG. 3. In general, the motor 3 has a characteristic that a rotation speed is reduced when a load (current) is increased. In this embodiment, as a constant rotation speed control, the conduction angle of the triac 27 is controlled so that the motor 3 rotates in a set target rotation speed even if the load fluctuates. Therefore, the rotation speed of the motor 3 can be maintained to be constant until the conduction angle of the triac 27 reaches 100%. The maximum conduction angle represents a conduction angle of the triac 27 in which an overcurrent value is caused and the motor 3 might cause burning. A maximum conduction angle ratio represents a ratio of the maximum conduction angle to a conduction angle of 100%. When the overcurrent value causing the burning of the motor 3 is assumed to be equal, the maximum conduction angle ratio is varied depending on the set target rotation speed and is also increased with an increase in the target rotation speed.

Figures 3, 4:
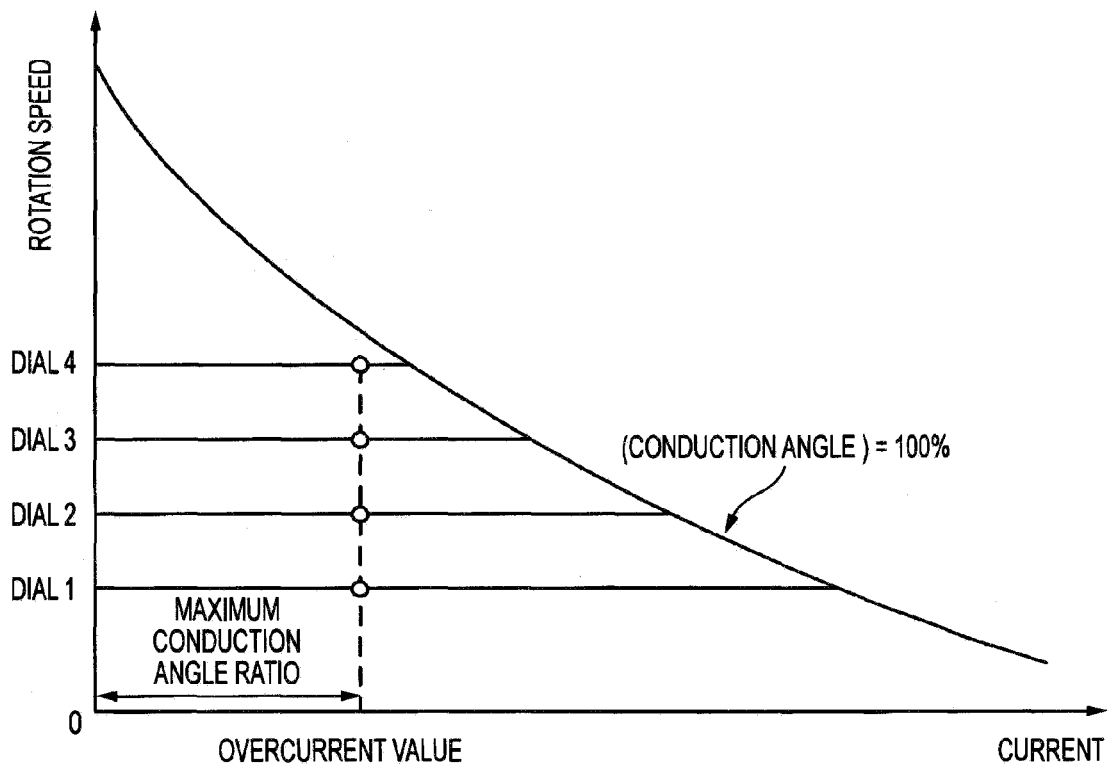
FIG. 3 illustrates a current-rotation speed characteristic of a motor 3.
FIG. 4 illustrates a table of a maximum conduction angle ratio according to Embodiment 1.
Figure 5:
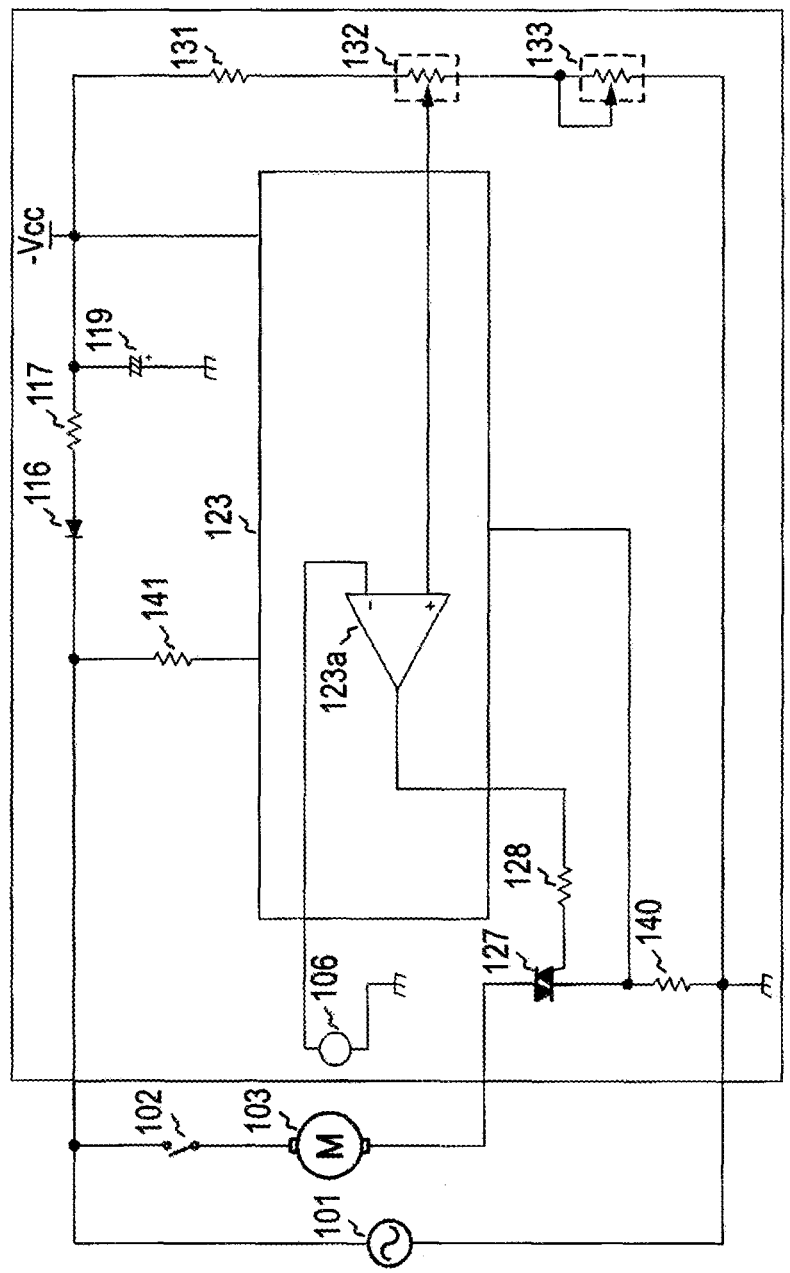
FIG. 5 illustrates a motor rotation control circuit according to the conventional art.

FIG. 4 illustrates a table of a specific maximum conduction angle ratio. In FIG. 4, two types of set value tables A and B are provided to correspond to two types of motors (motors for another power tools or the same tools having different performances). The set value table A or B can given to the microcomputer 23 by selecting the resistors 29 and 30. When only the resistor 29 is connected, the set value table A is selected. When only the resistor 30 is connected, the set value table B is selected. For example, the resistors 29 and 30 are selected in a manufacturing stage. The microcomputer 23 carries out time setting for the conduction angle to obtain the set maximum conduction angle in order to correspond to the frequency of the input power which is detected at the Step 201.

Figure 2:
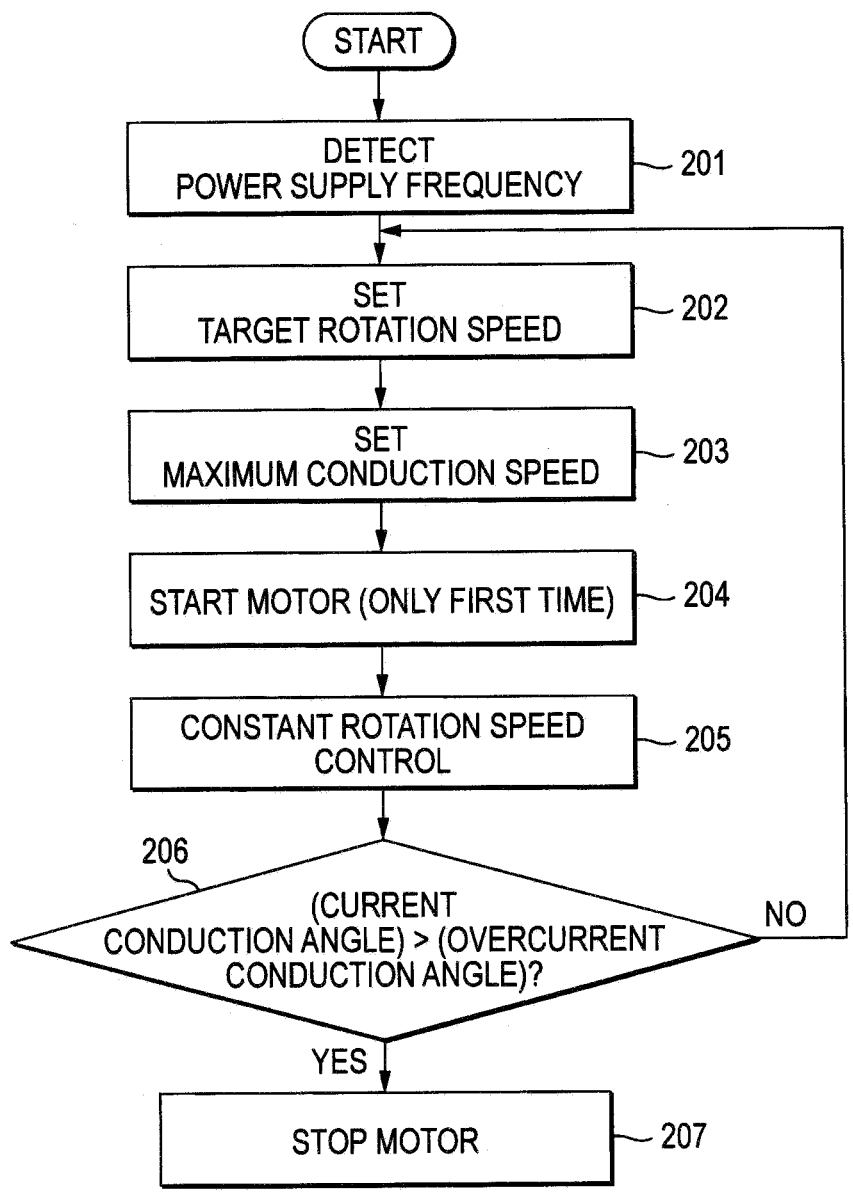
FIG. 2 illustrates an operation of a rotation speed control device according to Embodiment 1.

Returning to the flowchart of FIG. 2, when the maximum conduction angle is set at the Step 203 and the switch 2 is then turned ON, a switch ON signal having a voltage divided by the diode 24 and the resistors 25 and 26 is input to the microcomputer 23 so that the microcomputer 23 inputs a gate signal to a gate terminal of the triac 27 through the resistor 28. Thereafter, the triac 27 is turned ON so that a current flows to the motor 3 and the motor 3 is thus started to be rotated (Step 204).

At this time, a soft start operation is carried out so that the conduction angle is started from 0% with and is gradually increased with the zero-cross point detected by the zero-cross detection circuit 8 as a reference and the rotation speed of the motor 3 reaches the target rotation speed set by the resistor 31 and the variable resistors 32 and 33, in accordance with a preset time for starting the motor 3. Next, the microcomputer 23 performs a phase control for maintaining the rotation speed of the motor 3 constant by monitoring the rotation speed of the motor 3 which is detected by the rotation speed sensor 6 and the rotation speed signal amplification circuit 5 and controlling the gate signal input to the triac 27 to increase the conduction angle thereof when the rotation speed of the motor 3 is lower than the target rotation speed and to reduce the conduction angle thereof when the rotation speed of the motor 3 is higher than the target rotation speed (Step 205).

Then, the microcomputer 23 monitors whether a current conduction angle of the triac 27 exceeds the maximum conduction angle set at the Step 203 or not (Step 206). When the conduction angle of the triac 27 exceeds the maximum conduction angle set at the Step 203 for a certain period, the gate signal input to the triac 27 is stopped or the conduction angle is reduced extremely to protect the motor 3 (Step 207).

When the conduction angle of the triac 27 does not exceed the maximum conduction angle set at the Step 203, the processing returns to the Step 202 and the constant rotation control of the motor 3 and the monitoring of the conduction angle of the triac 27 are successively carried out.

As described above, according to this embodiment, it is decided that the overcurrent state is brought when the conduction angle of the triac exceeds the maximum conduction angle for the certain period, and the motor is stopped or the rotation speed is reduced. Therefore, it is possible to prevent burning of the motor with an inexpensive structure without using a shunt resistor for detecting a current. The maximum conduction angle is set corresponding to the frequency of the input AC power. Consequently, it is possible to eliminate a variance in an overcurrent prevention operating point due to a difference in the frequency of the AC power.

The maximum conduction angle is selected from at least two types of set value tables for the maximum conduction angle. Therefore, a plurality of motors can be controlled by a single control device.

Although the description has been given based on this embodiment, the invention is not restricted to the configuration but various changes can be made without departing from the scope thereof. For example, in the processing of the Step 205 in FIG. 2, it may be determined that the overcurrent is to be occurred when the conduction angle to be set for maintaining the rotation speed exceeds the maximum conduction angle set at the Step 203, and if determined so, a conduction angle to be actually set to the triac is kept at the maximum conduction angle to not cause an actual overcurrent.

Embodiment 2

Figure 6:
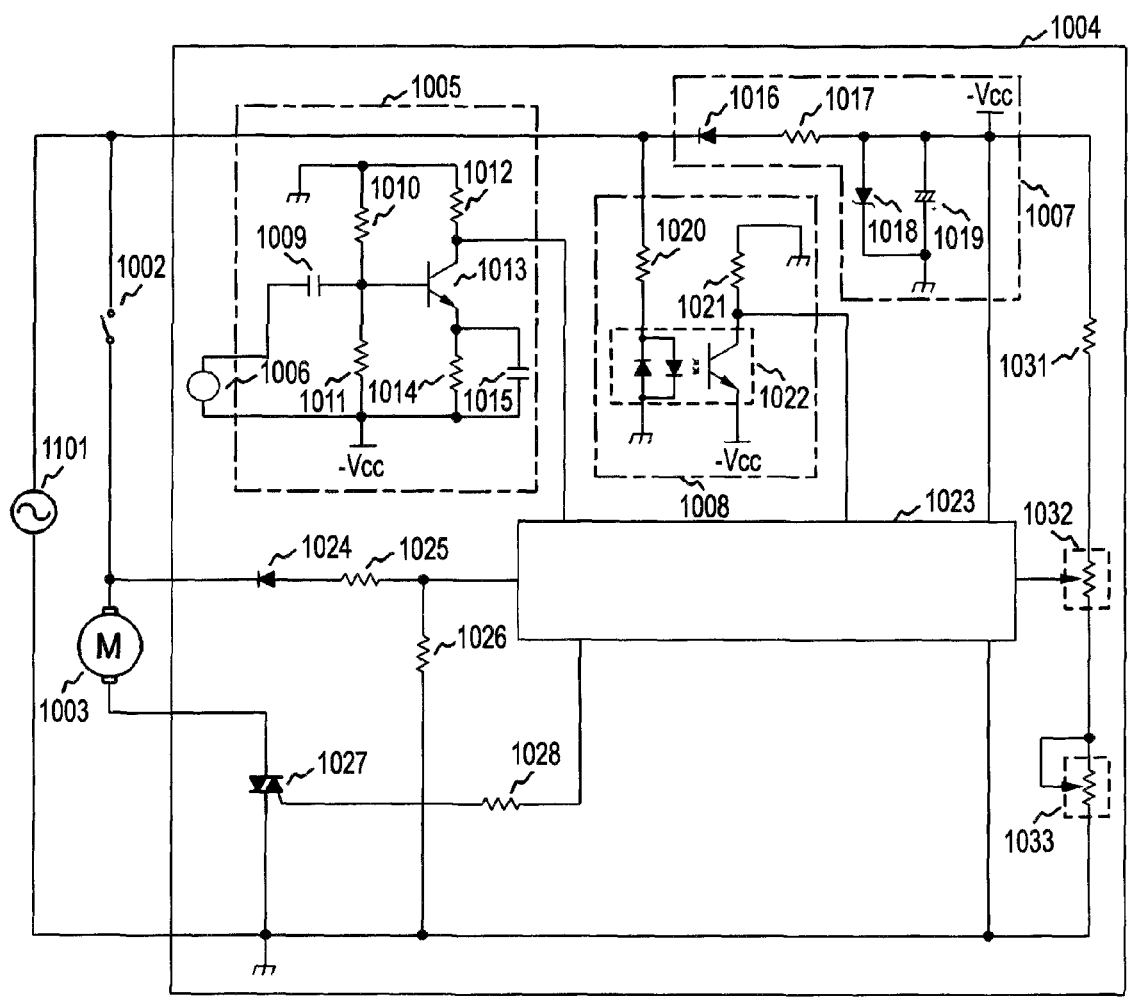
FIG. 6 illustrates a motor rotation control circuit according to Embodiment 2.

Embodiment 2 according to the invention will be described below with reference to the drawings. FIG. 6 illustrates a motor rotation control circuit according to this embodiment. An AC power supply 1101 has a single phase of 100V at 50 Hz or 60 Hz, for example, and an alternating current is ON/OFF controlled by a switch 1002. A rotation control device 1004 includes a rotation speed sensor 1006 for detecting a rotation speed of a motor 1003, a rotation speed signal amplification circuit 1005 for amplifying a rotation speed signal output from the rotation speed sensor 1006, a microcomputer 1023, a power circuit 1007 for creating a reference power supply to the microcomputer 1023 and a control circuit, a zero-cross detection circuit 1008 for detecting a zero-cross point of an AC voltage, a diode 1024 and resistors 1025 and 1026 for detecting ON/OFF of the switch 1002 and for transmitting a switch ON/OFF signal to the microcomputer 1023, a triac 1027 (semiconductor device) for controlling a phase of a voltage applied to the motor 1003, a resistor 1028 for inputting a gate signal to the triac 1027, a resistor 1031 and variable resistors 1032 and 1033 for setting the rotation speed of the motor 1003.

The rotation speed signal amplification circuit 1005 is an AC amplifier including capacitors 1009 and 1015, resistors 1010, 1011, 1012 and 1014, and a transistor 1013, and amplifies the rotation speed signal sent from the rotation speed sensor 1006 within a range of 0V to −VCC and outputs the amplified signal to the microcomputer 1023. The microcomputer 1023 uses the output signal to detect the rotation speed of the motor 1003. In some cases, however, an abnormal pulse signal is superposed on the output signal, for example, a line noise is mixed. In this embodiment, therefore, two of four pulses (corresponding to one rotation) of the rotation speed detecting signal which have greater pulse widths are selected to detect the rotation speed based thereon. The principle will be described with reference to FIG. 10.

Figure 10:
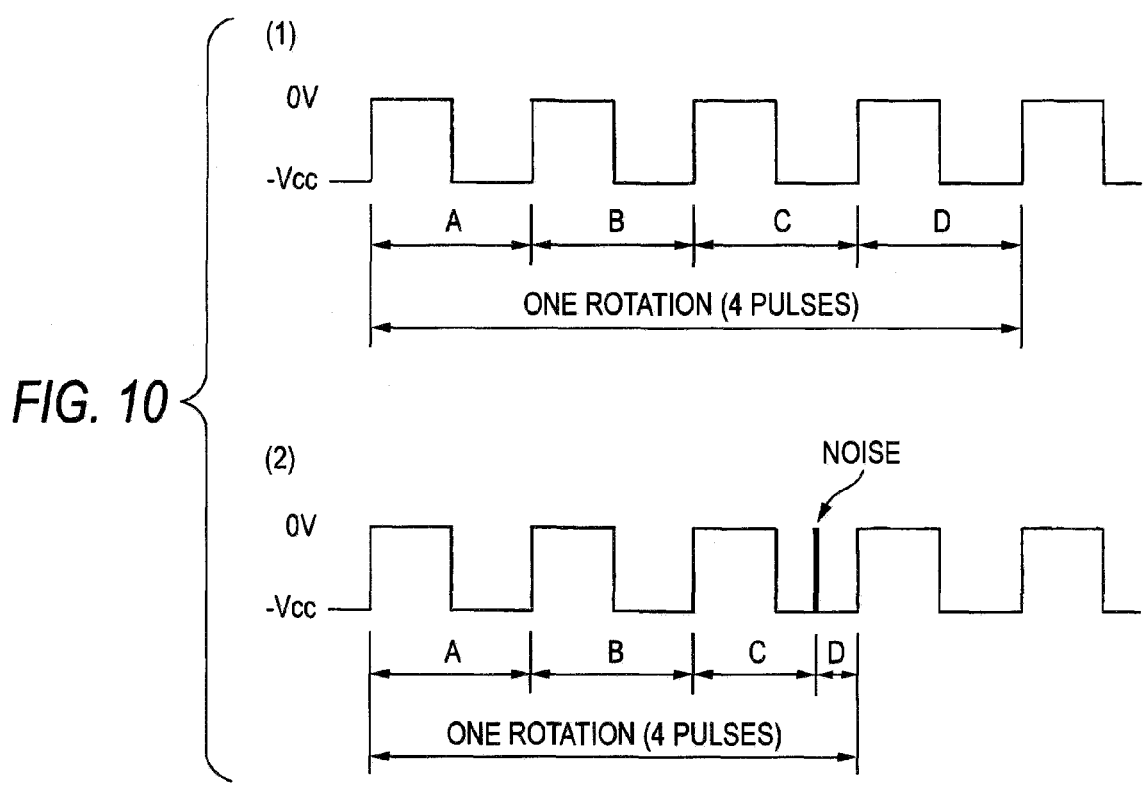
FIG. 10 illustrates a signal output from a rotation speed signal amplification circuit 1005 to a microcomputer 1023.

FIG. 10 illustrates a signal output from the rotation speed signal amplification circuit 1005 to the microcomputer 1023. FIG. 10(1) shows a rotation speed detecting signal in a normal state where a noise is not mixed. When the motor 1003 carries out one rotation, four pulses from a section A to a section D are transmitted as the rotation speed detecting signal. In this embodiment, two of the four pulses (corresponding to one rotation) of the rotation speed detecting signal which have greater pulse widths are selected, and the pulse widths are used to calculate the rotation speed of the motor 1003. In FIG. 10(1), two of the sections A to D are selected and the rotation speed of the motor 1003 is detected from the pulse widths (time intervals).

On the other hand, FIG. 10(2) shows a rotation speed detecting signal in the case in which a noise is mixed. For example, switching of a section is detected with a rise in a signal to be output from −Vcc to 0V. If such the noise is superposed, the rise of the signal due to the noise is recognized as a termination of the section C. As a result, the sections C and D are erroneously detected. On the other hand, in this embodiment, since two pulses in the sections A and B having greater pulse widths among the four pulses are used to detect the rotation speed of the motor 1003, even if the abnormal pulse such as a line noise is superposed on the rotation speed detecting signal, the influence can be removed effectively and a noise resistance of the power tool can be enhanced considerably.

Returning to FIG. 6, the power circuit 1007 is a half-wave rectifying circuit which includes a diode 1016, a resistor 1017, a zener diode 1018, and an electrolytic capacitor 1019, and serves to convert an AC voltage into a direct current and to supply the direct current into the microcomputer 1023 and a circuit of the power tool which is not shown.

The zero-cross detection circuit 1008 includes resistors 1020 and 1021 and a photocoupler 1022. An AC voltage is first attenuated by the resistor 1020 and is sent to an input portion (light emitting diode) of the photocoupler 1022. Two light emitting diodes are connected to the input portion of the photocoupler 1022 in reverse directions to each other. The light emitting diodes emit a light regardless of a current flow direction, and are turned OFF only around a zero-cross point, that is, at a low voltage. The photocoupler 1022 includes a phototransistor as an output portion, and is brought into an ON state only when the light emitting diode in the input portion emits alight. In other words, the phototransistor is brought into an OFF state only on the zero-cross point and is brought into the ON state in the other range. Therefore, 0V is input to the microcomputer 1023 through the resistor 1021 on only the zero-cross point and −VCC is input in the other range. By a change in a signal to be input to the microcomputer 1023, the microcomputer 1023 can obtain a reference signal for controlling a phase of the triac 1027.

Next, an operation of the rotation speed control device 1004 will be described with reference to a flowchart of FIG. 7. When an AC cord (not shown) of the power tool is connected so that an AC voltage is supplied from the AC power supply 1101, a constant DC voltage is supplied into the microcomputer 1023 and the control circuit by the power circuit 1007 so that the power tool is brought into a standby state. The AC voltage supplied from the AC power supply 1101 is input to the zero-cross detection circuit 1008. And, the microcomputer 1023 measures time intervals of a zero-cross signal input from the zero-cross detection circuit 1008 to detect a frequency of the input AC power (Step 1201).

Then, the microcomputer 1023 detects a target rotation speed setting voltage of the motor 1003 which is set by the resistor 1031 and the variable resistors 1032 and 1033 and sets a target rotation speed (Step 1202). The variable resistor 1032 is manipulated by a user through a dial to set a rotation speed, and is a setting unit to set the rotation speed of the motor 1003 in several stages (for example, four stages of 1 to 4 of the dial), for instance. The variable resistor 1033 is provided to suppress a variation in a control circuit.

Thereafter, the microcomputer 1023 sets a maximum conduction angle of the triac 1027 in a starting operation of the motor 1003 (Step 1203). Not one but two maximum conduction angles are set. A first maximum conduction angle is to be applied from the starting of the motor 1003 to a first predetermined time, and a second maximum conduction angle is to be applied from the first predetermined time to a second predetermined time. It is preferable that the second maximum conduction angle is smaller than the first maximum conduction angle.

Since a responsiveness of a rotation control is generally quicker than a responsiveness of the motor 1003, when the motor 1003 is started, the conduction angle of the triac 1027 is excessively increased in the rotation control due to a delay of the responsiveness of the motor 1003. As a result, there is obtained a starting characteristic in which the target rotation speed is once exceeded to cause an overshoot and the target rotation speed is then approximated like a curve shown in a dotted line on an upper side of FIG. 8. For example, the overshoot can be inhibited by adjusting the responsiveness of the rotation speed control to be slower than that of the motor 1003. However, a time required for the starting operation is increased. In this embodiment, therefore, two stages of the maximum conduction angle are provided for the triac 1027 to prevent the overshoot in the starting operation of the motor 1003. At the Step 1203, the maximum conduction angle is set.

Figures 8, 9:
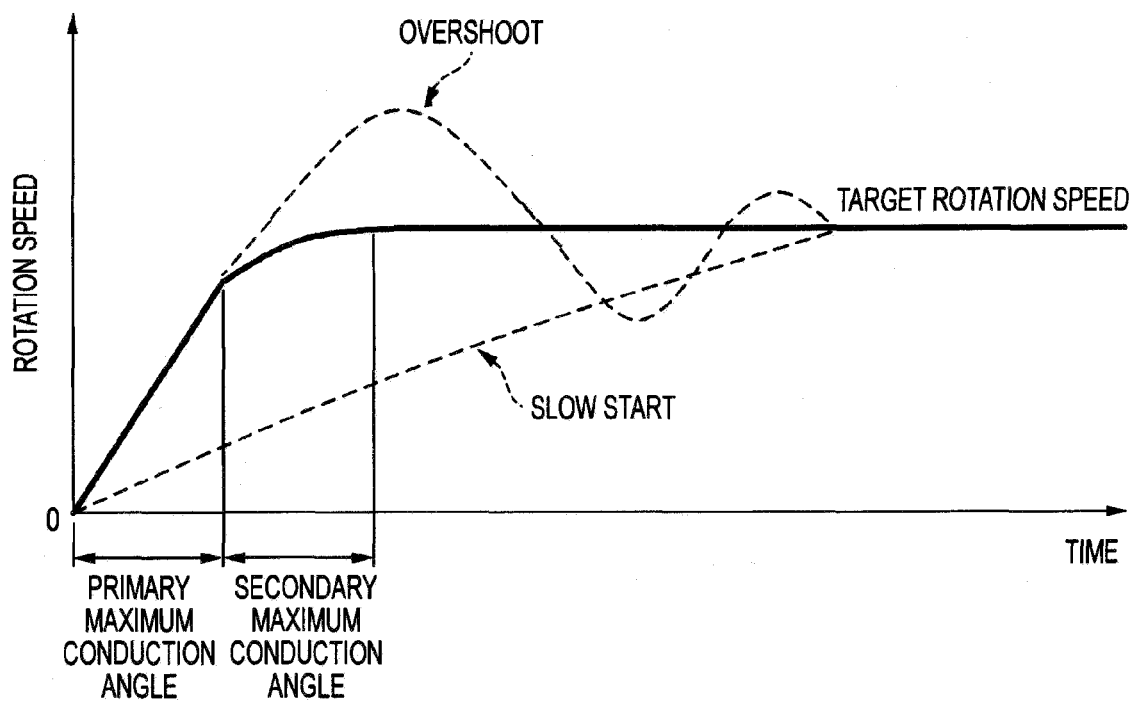
FIG. 8 illustrates a starting characteristic of a motor 1003.
FIG. 9 illustrates a table of a maximum conduction angle according to Embodiment 2.

FIG. 9 illustrates a table of a specific maximum conduction angle. There are provided a primary maximum conduction angle for a given time (for example, 0 to 0.5 second) from the starting operation of the motor and a secondary maximum conduction angle for a given time (for example, 0.5 to 1.0 second) from a period of the primary maximum conduction angle. The primary maximum conduction angle is set to be greater than the secondary maximum conduction angle in order to quickly start the motor. The secondary maximum conduction angle is set so that adjustment to the target rotation speed is performed therewithin. An optimum value may be previously obtained for the set values by an experiment. The value is stored in a storage unit of the microcomputer 1023. It is preferable to provide a plurality of set value tables, for example, set value tables for 50 Hz and 60 Hz separately so as to be compatible with the frequency of the input power which is detected at the Step 1201. The microcomputer 1023 carries out the time setting for the conduction angle in order to obtain a set maximum conduction angle by using the maximum conduction angle stored in the set value table.

Figure 7:
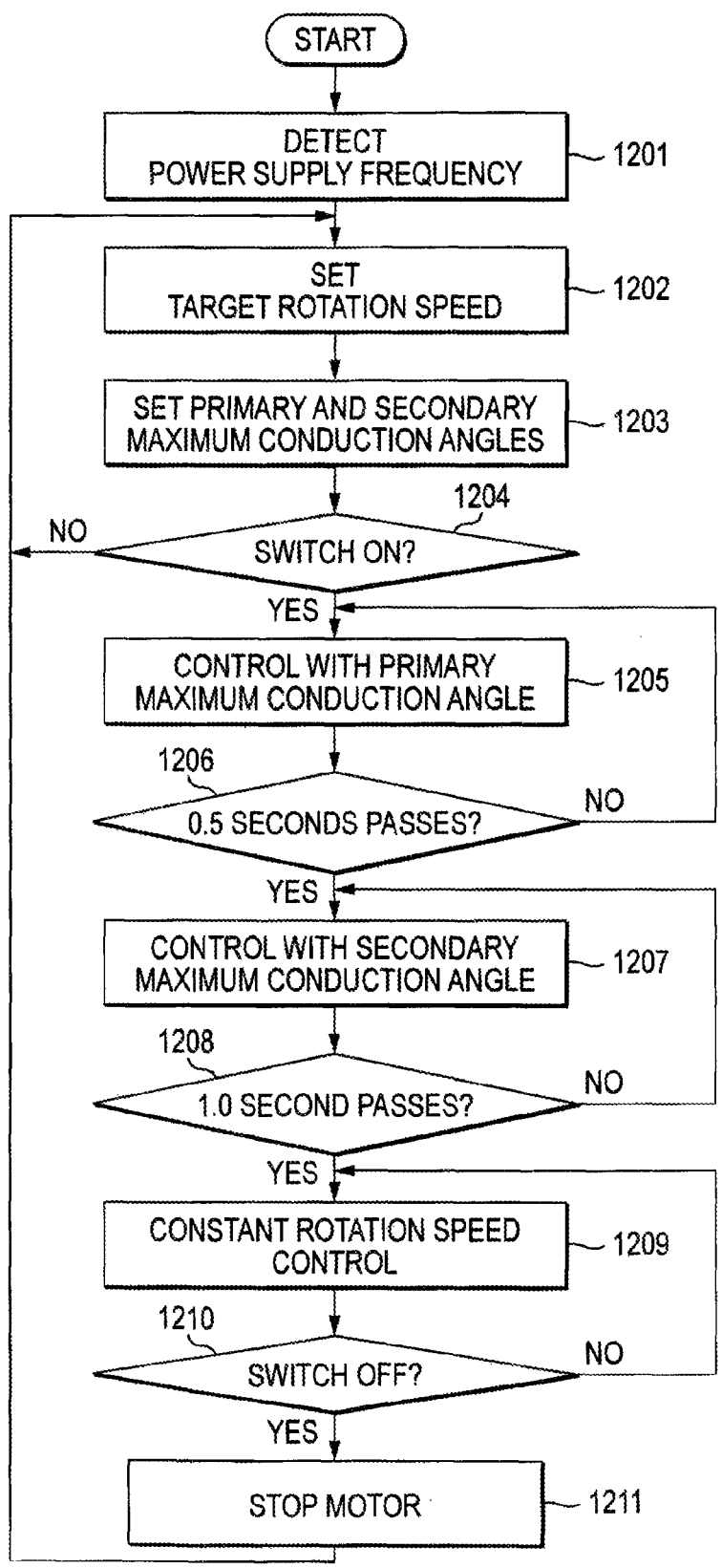
FIG. 7 illustrates an operation of a rotation speed control device according to Embodiment 2.

Returning to the flowchart of FIG. 7, the microcomputer 1023 detects a switch ON signal having a voltage divided by the diode 1024 and the resistors 1025 and 1026 and monitors a state of the switch 1001 (Step 1204). When the switch 1002 is turned ON, the microcomputer 1023 inputs a gate signal to a gate terminal of the triac 1027 through the resistor 1028. Then, the triac 1027 is turned ON so that a current is started to flow to the motor 1003 and the motor 1003 is thus started to be rotated (Step 1204). At this time, the microcomputer 1023 controls the rotation speed of the motor 1003 for a period of 0.5 second within a range of the primary maximum conduction angle in the starting operation of the motor 1003 which is set at the Step 1203 (Step 1206). Subsequently, the microcomputer 1023 controls the rotation speed of the motor 1003 for a period of 0.5 second (1.0 second after the starting operation of the motor 1003) within a range of the secondary maximum conduction angle in the starting operation of the motor 1003 which is set at the Step 1203 (Steps 1207 and 1208). In this embodiment, an interval (length) of each section is determined so that the motor 1003 reaches the target rotation speed when primary and secondary maximum conduction angle sections are ended. The interval of the section may be preset based on a characteristic of the motor, a structure of the power tool or a type of the power supply and may be stored in the microcomputer 1023.

Next, the microcomputer 1023 carries out a constant rotation control so that the rotation speed of the motor 1003 reaches the target rotation speed set by the resistor 1031 and the variable resistors 1032 and 1033. The microcomputer 1023 performs a phase control to maintain the rotation speed of the motor 1003 constant by monitoring the rotation speed of the motor 1003 which is detected by the rotation speed sensor 1006 and the rotation speed signal amplification circuit 1005 and by controlling the gate signal to the triac 1027 to increase the conduction angle thereof when the rotation speed of the motor 1003 is lower than the target rotation speed and to reduce the conduction angle thereof when the rotation speed of the motor 1003 is higher than the target rotation speed (Step 1209).

Then, the microcomputer 1023 monitors the state of the switch 1002 (Step 1210). If the switch 1002 is set into the ON state, the processing returns to the Step 1209 and the constant rotation control is successively carried out. If the switch 1002 is set into the OFF state, the motor 1003 is stopped (Step 1211) and the processing returns to the Step 1202 to bring the standby state where the switch 1002 has not been turned ON.

Figure 11:
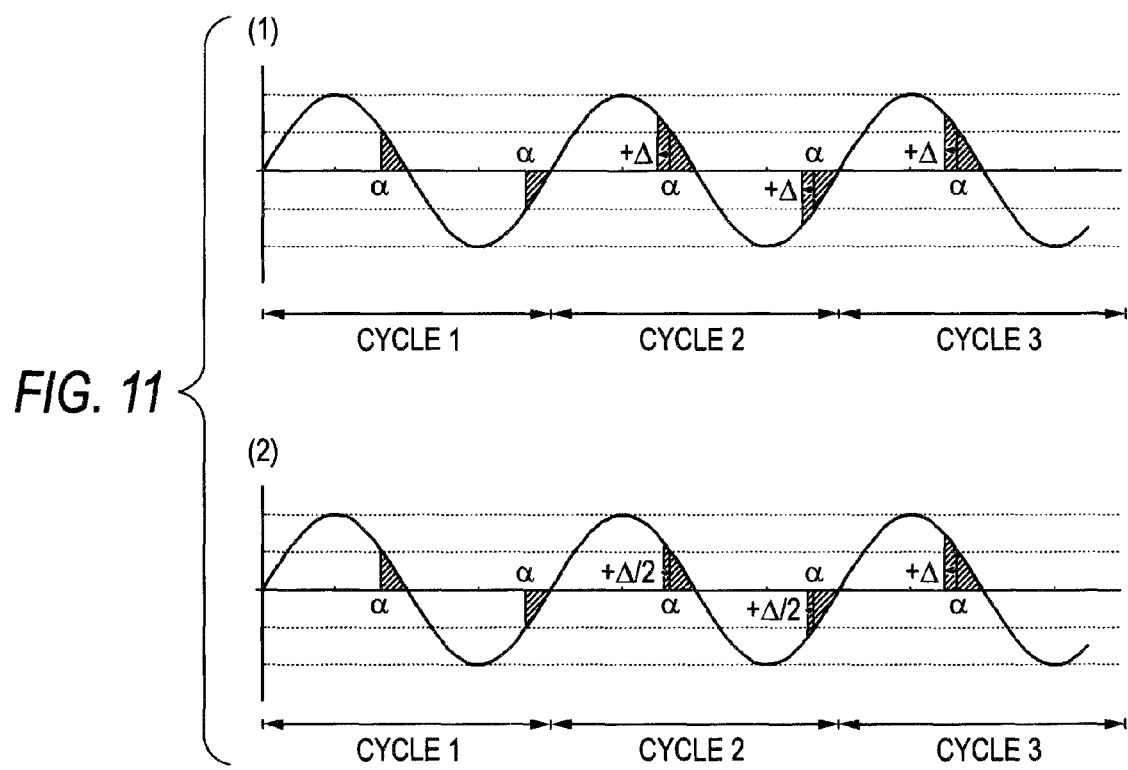
FIG. 11 illustrates a relationship between a voltage waveform supplied to the motor 1003 and a conduction angle.

Next, the constant rotation control will be described with reference to FIG. 11. FIG. 11 illustrates a relationship between a waveform of a voltage supplied to the motor 1003 and a conduction angle. It is assumed that, in a cycle 1, a conduction angle α is adapted and the microcomputer 1023 decides that the conduction angle α is to be increased by Δ in comparison of the detecting signal output from the rotation speed detection unit with the rotation speed setting signal set by the rotation speed setting unit. According to a conventional rotation control method shown in FIG. 11(1), an instruction of the microcomputer 1023 is instantly reflected a control of later cycles (cycle 2 and following cycles) so that the triac 1027 is operated at a conduction angle (α+Δ). If the conduction angle is thus changed suddenly in the next cycle 2, the rotation of the motor 1003 fluctuates comparatively rapidly, and in a power tool, a kickback is caused when driving of a tip tool is started. The state is indicated as a control 1 shown in a dotted line of FIG. 12. When the rotation speed of the motor is reduced on a point "a" in FIG. 12, the microcomputer 1023 detects the reduction and carries out a control for a return to a setting rotation. In the conventional control 1, since a variation in the conduction angle is great, the rotation speed of the motor may be increased excessively suddenly as shown in a dotted line of the control 1.

Figure 12:
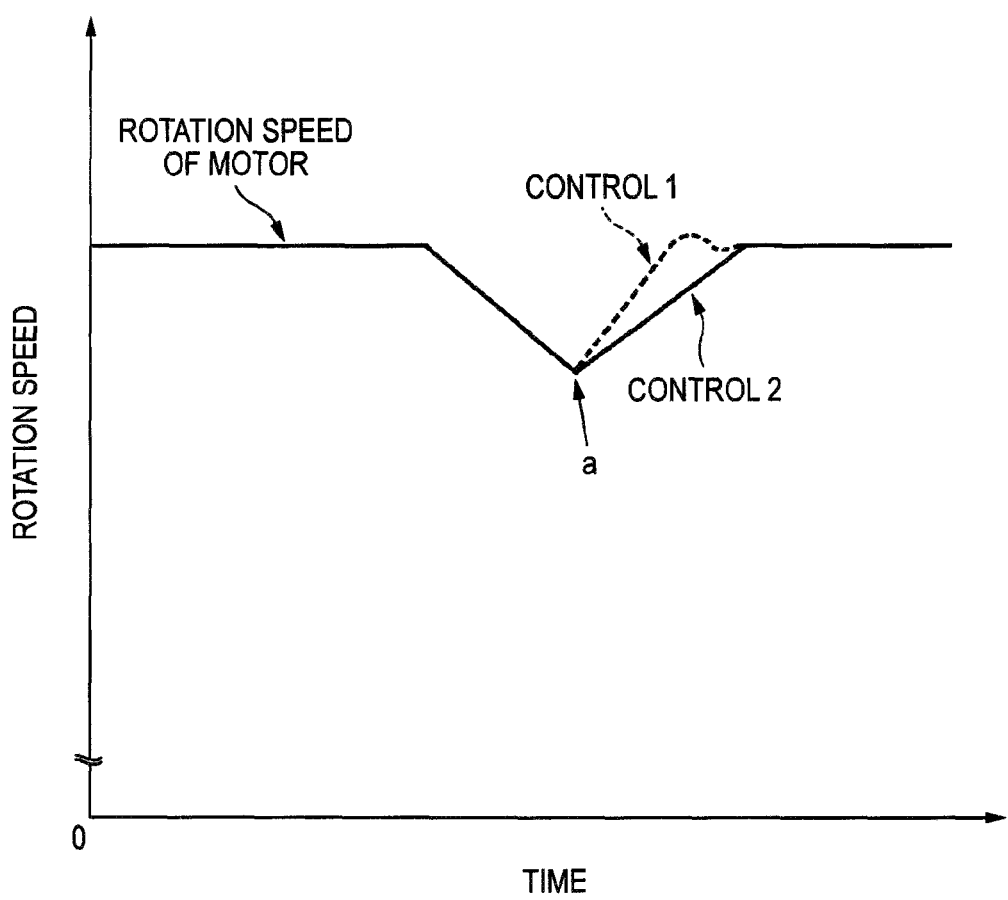
FIG. 12 illustrates a relationship between a fluctuation in a rotation of the motor 1003 and a feedback control.

In this embodiment, also in the case in which the microcomputer 1023 decides that the conduction angle is to be increased (+Δ) in a certain cycle (for example, the cycle 1 in FIG. 11(2)) as shown in FIG. 11(2), the increment Δ is not immediately given in the next cycle 2 but is reflected at a certain rate (for example, ½) in the next cycle 2 and is fully reflected after a subsequent cycle 3. The conduction angle is not instantaneously reflected in a next cycle but is reflected to be increased gradually, thereby enabling a smooth control. A control 2 shown in a solid line of FIG. 12 indicates a rotation state of the motor in the control. In FIG. 12, the rotation speed of the motor is reduced on the point "a". However, the microcomputer 1023 gradually reflects a variation in the conduction angle. Therefore, a rise in the rotation speed of the motor is slow as shown in the control 2.

It is hard to implement the delay control in a conventional analog feedback control. Contrary, in this embodiment, since a digital control is carried out by using the microcomputer 1023, the delay control can be implemented comparatively easily. Although the variation in the conduction angle is set into the two stages and an increase ratio thereof is set to be equal in this embodiment, the invention is not limited thereto. For example, an increase ratio of $+2\Delta/3$ is applied in the cycle 2, and an increase ratio of $+\Delta$ may be applied in and after the cycle 3. Further, it may be changed in three or more stages.

According to this embodiment, the conduction angle of the semiconductor device is controlled so that the first maximum conduction angle is not exceeded from the starting operation of the motor to the first predetermined time, and is controlled so that the second maximum conduction angle which is smaller than the first maximum conduction angle is not exceeded from the first predetermined time to the second predetermined time. Therefore, it is possible to ideally start and accelerate the motor without causing an overshoot, and a time required for the starting operation can be shortened.

The invention is not restricted to the structure according to this embodiment but various changes and applications can be made. Although a ratio of the primary maximum conduction angle to the secondary maximum conduction angle is constant in the set value table shown in FIG. 9 in this embodiment, the invention is not restricted thereto. In other words, in FIG. 9, there are set the primary maximum conduction angle: the secondary maximum conduction angle=15%:10%=3:2 in a dial 1 and the primary maximum conduction angle:secondary maximum conduction angle=60%:40%=3:2 in a dial 4. Even if the ratio is not always constant but is set variably, it is possible to obtain the advantages of the invention. Although a % value is stored in the set value table in FIG. 9, it may be stored as a value converted into a time value (for example, 15% is set as 1/50 second X 15%=0.003 second in 50 Hz) and the time value may be used to carry out the control.

Next, another example of the set value table will be described with reference to FIG. 13. FIG. 13 illustrates another example of the target rotation speed of the motor 1003 and the maximum conduction angle in the starting and accelerating operations. In another example, the dial set value is not set into four stages but 12 stages. In FIG. 13, a primary maximum conduction angle:a secondary maximum conduction angle=10%:5%=2:1 is set in a state where the target rotation speed is the lowest (dial 1) and the primary maximum conduction angle:the secondary maximum conduction angle=65%:43%=approximately 3:2 is set in a state where the target rotation speed is the highest (dial 12). In other words, the primary maximum conduction angle:the secondary maximum conduction angle is changed into 2:1 to 3:2 depending on a position of the dial. By particularly increasing the ratio of the primary maximum conduction angle to the secondary maximum conduction angle at a low rotation speed, thus, it is possible to prevent a starting torque from being reduced, thereby implementing an excellent starting characteristic.

Next, the feedback control of the motor will be described with reference to FIG. 14. FIG. 14 illustrates a relationship between a deviation from the target rotation speed of the motor 1003 and a feedback amount. In this embodiment, a unit amount of a feedback in the starting and accelerating operations of the motor is set to be larger than that of the feedback in a steady rotation of the motor. In this embodiment, a feedback (FB) amount in 16 stages is set depending on a range of the target rotation speed, and the feedback amount in the starting operation (soft start) and the FB amount of the steady rotation speed are different from each other. In other words, at a time of the soft start, the feedback amount is increased to shorten a time required for starting the motor. On the other hand, at a steady rotation speed, the feedback amount is set to be smaller than that in the soft start and a fluctuation in the rotation of the motor is suppressed as greatly as possible. By changing a control in the starting operation of the motor and the steady rotation thereof, thus, a power tool which can easily be handled by a user is provided.

Although the description has been given based on this embodiment, the invention is not restricted to the configuration but various changes can be made without departing from the scope thereof. For example, although the maximum conduction angle of the triac 1027 for the motor starting period is set into the two stages in Embodiment 2, it may be set into more stages. By increasing the number of the stages, it is possible to carry out the starting operation of the motor with higher precision.

What is claimed is:

1. A power tool comprising:
   a motor;
   a switching device that switches over, in response to a conduction angle thereof, an AC voltage to be applied to the motor;
   a rotation speed setting unit that sets a target rotation speed of the motor;
   a rotation speed detection unit that detects an actual rotation speed of the motor; and
   a controller that determines the conduction angle by comparing the actual rotation speed with the target rotation speed and that controls the switching device by use of the conduction angle based on a maximum conduction angle, the maximum conduction angle being set in accordance with the target rotation speed,
   wherein the controller stops the motor based on the maximum conduction angle.

2. The power tool of claim 1, wherein the controller detects an overcurrent state when the conduction angle exceeds the maximum conduction angle.

3. The power tool of claim 1, wherein the controller has a storage unit, and
   wherein the storage unit pre-stores a relationship between the target rotation speed and a corresponding maximum conduction angle at which an overcurrent is caused.

4. The power tool of claim 3, wherein the relationship between the target rotation speed and the corresponding maximum conduction angle is set for each frequency of input AC power.

5. The power tool of claim 1, wherein the rotation speed setting unit is a dial switch, and
   wherein the maximum conduction angle is set in accordance with a manipulation of the dial switch.

6. The power tool of claim 1, wherein the controller reduces the target rotation speed of the motor based on the maximum conduction angle.

7. The power tool of claim 1, wherein the controller reduces the actual rotation speed by decreasing the conduction angle based on the maximum conduction angle.

8. The power tool of claim 1, wherein the controller calculates the conduction angle by comparing the actual rotation speed with the target rotation, and
   wherein the controller outputs a regulated conduction angle to the switching device, the regulated conduction angle being the same as the maximum conduction angle if the calculated conduction angle exceeds the maximum conduction angle.

9. A power tool comprising:

a motor;

a switching device that switches over, in response to a conduction angle thereof, an AC voltage to be applied to the motor;

a controller that controls the conduction angle, thereby controlling an actual rotation speed of the motor, wherein, when starting the motor, the controller controls the conduction angle within a range of a first maximum conduction angle during a first period and within a range of a second maximum conduction angle that is smaller than the first maximum conduction angle during a second period, the first period starting at a start-up of the motor, the second period being continuous with the first period.

10. The power tool of claim 9, wherein the controller has a storage unit, and wherein the storage unit pre-stores the first maximum conduction angle and the second maximum conduction angle.

11. The power tool of claim 9, further comprising:

a rotation speed setting unit that sets a target rotation speed of the motor; and a rotation speed detection unit that detects the actual rotation speed of the motor, wherein the controller determines the conduction angle by comparing the actual rotation speed with the target rotation speed.

12. The power tool of claim 10, wherein the storage unit stores a plurality of sets of the first maximum conduction angle and the second maximum conduction angle for each target rotation speed.

13. The power tool of claim 12, wherein the storage unit stores a relationship between the first maximum conduction angle and the second maximum conduction angle for each frequency of input AC power.

14. The power tool of claim 12, wherein the storage unit stores a ratio of the first maximum conduction angle to the second maximum conduction angle for each target rotation speed.

15. The power tool of claim 9, wherein the first period is defined from a time where the motor is started up to a time where a given time has been elapsed, and wherein the second period is defined from a time where the motor is still not reached to a steady rotation speed to a time where the motor is reached to the steady rotation speed.

16. The power tool of claim 15, wherein the controller performs a feedback of a deviation of the actual rotation speed from the target rotation speed through a proportional element, and wherein a unit amount of the feedback of the motor is controlled to be larger in a time of starting and accelerating than that in a time of steadily rotating.

* * * * *